(No Model.) W. W. GRANT. 4 Sheets—Sheet 1.
ROAD VEHICLE.

No. 552,757. Patented Jan. 7, 1896.

Witnesses
Jas E. Hutchinson
G. F. Downing

Inventor
W. W. Grant
By H. A. Seymour
Attorney (No Model.) 4 Sheets—Sheet 2.
W. W. GRANT.
ROAD VEHICLE.
No. 552,757. Patented Jan. 7, 1896.
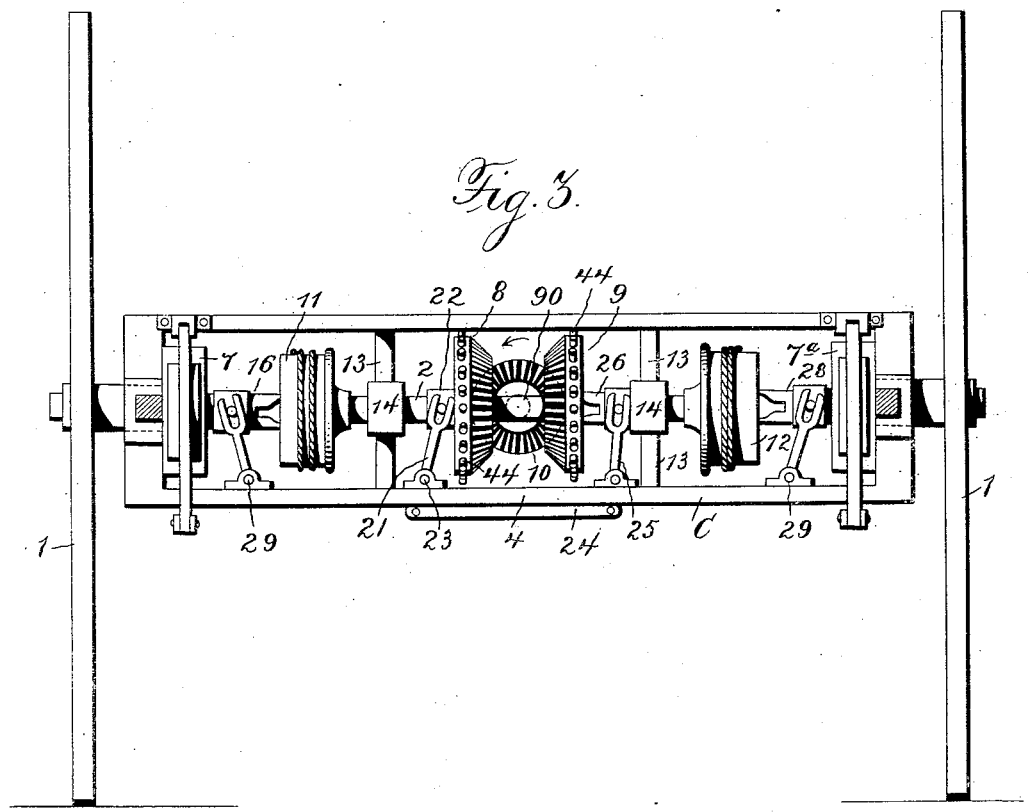
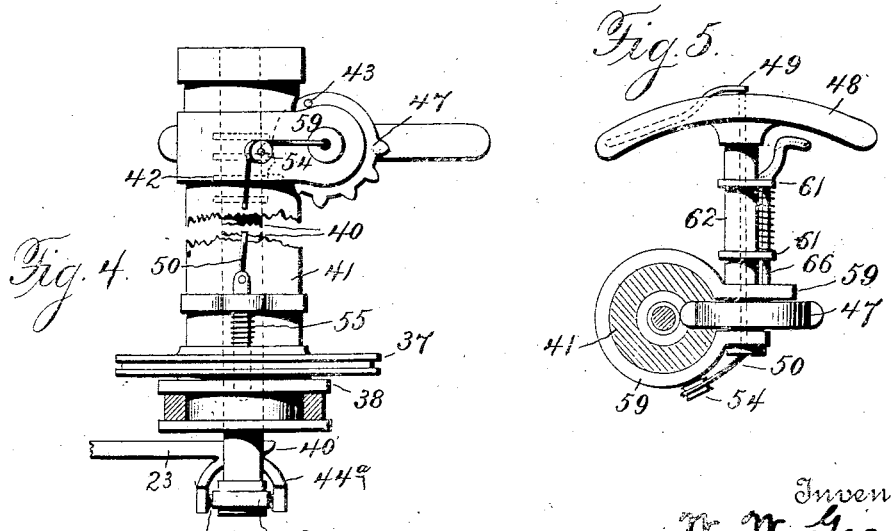
Witnesses
Jas. E. Hutchinson.
G. F. Downing.
Inventor
W. W. Grant
By H. A. Seymour
Attorney (No Model.) 4 Sheets—Sheet 3.
W. W. GRANT.
ROAD VEHICLE.
No. 552,757. Patented Jan. 7, 1896.
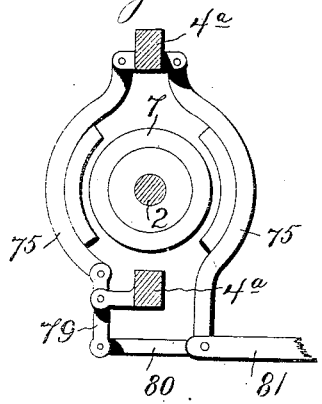
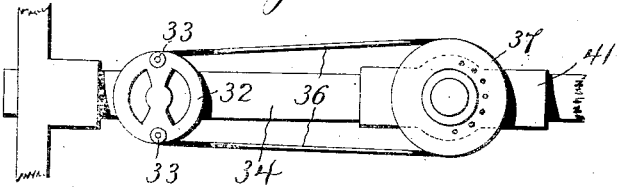
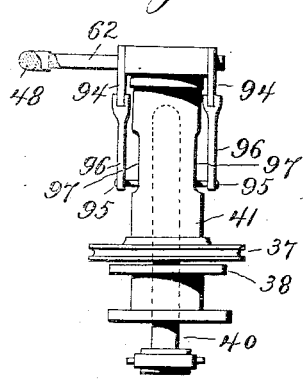
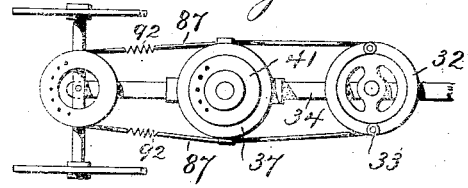
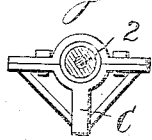
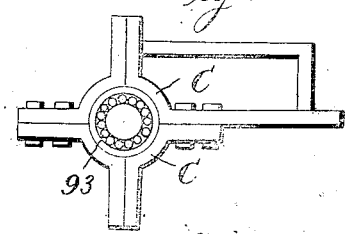
Witnesses
Jas. E. Hutchinson
G. F. Downing
Inventor
W. W. Grant
By H. A. Seymour
Attorney

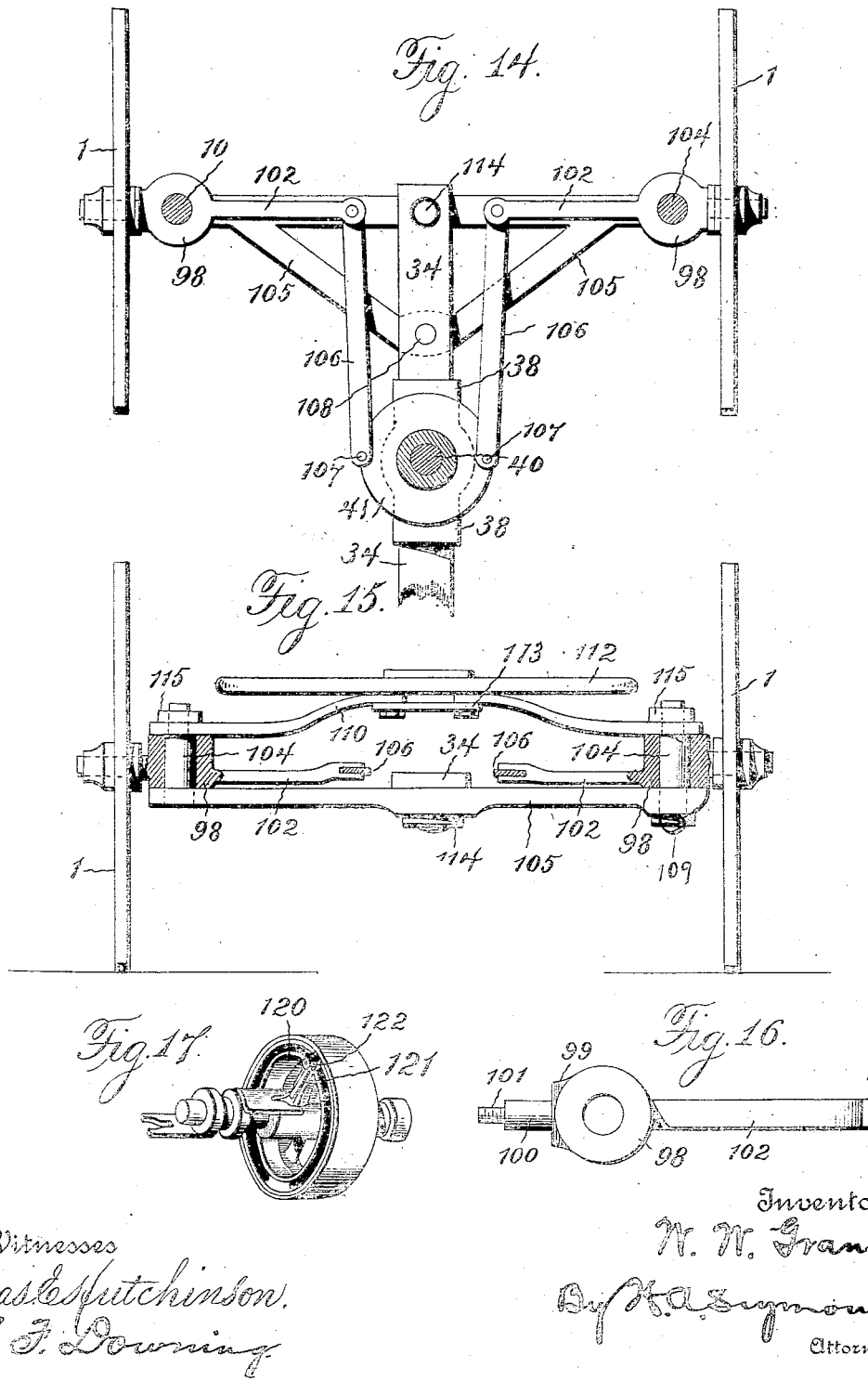

UNITED STATES PATENT OFFICE.

WILLIAM WALLACE GRANT, OF BROOKLYN, NEW YORK.

ROAD-VEHICLE.

SPECIFICATION forming part of Letters Patent No. 552,757, dated January 7, 1896.

Application filed July 17, 1895. Serial No. 556,270. (No model.)

*To all whom it may concern:*

Be it known that I, WILLIAM WALLACE GRANT, of Brooklyn, in the county of Kings and State of New York, have invented certain new and useful Improvements in Road-Vehicles; and I do hereby declare the following to be a full, clear, and exact description of the invention, such as will enable others skilled in the art to which it appertains to make and use the same.

My invention relates to an improvement in road-vehicles, the object being to provide a vehicle driven by a motor, with devices whereby the operator can by the movement of a single lever control all the movements of the vehicle.

My invention consists in a driving-axle and mechanism for connecting it with and disconnecting it from either driving-wheel.

It further consists in a driving-axle, means for connecting it with and disconnecting it from either driving-wheel, and means for reversing the direction of rotation of said axle.

It further consists in a driving-axle, driving-wheels thereon, and means connecting the axle and front or steering-wheels for guiding the latter.

It further consists of a driving-axle, wheels loose thereon, gearing for guiding the steering-wheels, clutches for locking the wheels to the axle, and devices for connecting the clutches and steering-gear whereby when the clutches or either of them is operated the steering-gear is set in motion.

My invention further consists in connecting the various clutches and other controlling parts to a single handle, whereby all the movements of the vehicle are under the absolute control of the operator.

My invention consists in other parts and combinations of parts and in certain details of construction, as will be more fully described, and pointed out in the claims.

Figure 1:
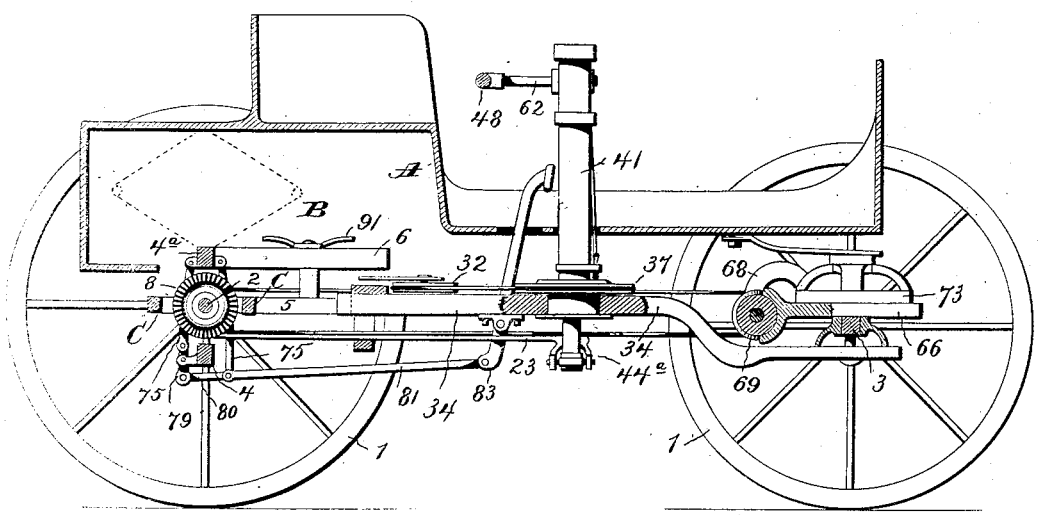
Figure 2:
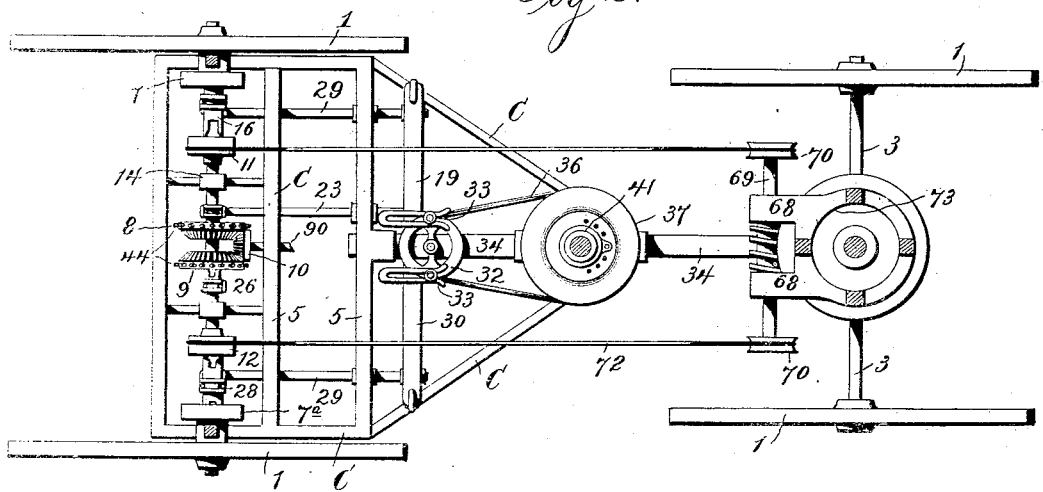

In the accompanying drawings, Figure 1 is a view in vertical longitudinal section of a vehicle embodying my invention. Fig. 2 is a plan view of same partly in section, the body of the vehicle being removed. Fig. 3 is a view in elevation of the rear axle or shaft and parts thereon. Fig. 4 is a view of the controller. Fig. 5 is a view in transverse section of same. Fig. 6 is a detached view of one of the brakes. Figs. 7, 8, and 9 are detached views of parts shown in Fig. 2. Fig. 10 is a view of a modified form of controller. Fig. 11 is a modified form of steering-gear. Figs. 12 and 13 are views of modified forms of frame carried by the driving-axle. Fig. 14 is a view in plan of a modified arrangement for guiding the steering-wheels. Fig. 15 is a view in front elevation of same. Fig. 16 is a view of one of the lever-arms, and Fig. 17 is a view of the clutch.

A represents the vehicle-body, which may be of any desired size and construction, preferably provided at a point under and in rear of the seat with a compartment B for the motor which furnishes the propelling-power.

While I prefer to employ a gasoline-motor for propelling the vehicle, I do not confine myself to the employment of such motor, as there are various other motors that could be used with good result. The motor employed is however coupled up to the driving-axle by gearing and mechanism which will hereinafter be referred to.

The body A is mounted on springs carried by the frame C, which latter embraces the driving-axle 2, and is supported at its sides on the inner ends of or through the hubs, the sides of the frames having boxes or bearings to receive the wheel-hubs. This frame is provided at intervals with the inwardly-projecting arms 13, each set carrying at their inner ends a box or bearing 14, embracing the axle and assisting in supporting the same. This frame is continued forward, the sides thereof converging and joining the reach-bar 34, the rear end of which latter extends rearwardly behind the point of engagement with the converging sides of the frame to a point in front of the axle 2 and is secured to the frame C by bolts or otherwise. The front end of the reach is connected by a king-bolt to the fifth-wheel of the vehicle.

The frame C is designed, primarily, to support the several parts to be hereinafter described, and, as can be seen from the drawings, is located below the vehicle-body and carries the rear springs on which the body is mounted. If desired, the upper cross-bar (shown in Figs. 1 and 3) of the frame C can be omitted, as shown in Fig. 12, and in the construction disclosed in this latter figure and also in Fig. 15 it is made in two parts bolted around the hubs, and, if desired, antifriction balls or rollers 93 may be interposed to lessen the friction. The hubs of the axles pass through these bearings, while the drums 7 7ᵃ, which are located within the frame C adjacent to the sides thereof, are fast to the hubs. Hence it follows that when the drums 7 and 7ᵃ, which are simply sections of clutches, are caused to rotate the wheels 1 also rotate and propel the vehicle. The inner sections of the hubs or hub-facings and the drums 7 7ᵃ might be integral, or the drums may have integral sleeves which pass through the end bearings of the frame and connected outside of the frame to the hubs. These details are not essential, as my invention comprehends, broadly, the main features herein disclosed, and is not limited to the mere details. The driving-axle 2 is loosely carried by the wheels 1 and carries drums 7, 7ᵃ, 8, 9, 11 and 12.

The drums 8 and 9 are located at or near the center of the axle, and are provided at their inner faces with bevel-teeth which mesh with pinion 10 on shaft 90, and may be connected up directly to the motor or geared thereto by a pinion on the shaft meshing with a pinion on the motor. This shaft is preferably of the flexible or yielding variety, which may be in the form of a spiral, links, universal joints, or shaft provided with such joints, or other type or flexible or yielding shaft variety leads to the motor mounted on the springs 91, carried by the sections 5 6 of the frame C, or the motor may be carried by or within the carriage-body instead of upon the springs 91, if so preferred. By thus yieldingly mounting the motor on the running-gear of the vehicle and connecting it to the driving-axle by a flexible shaft, the motor is free to give or yield while passing over rough roads, and the jar and shock which would otherwise ensue are absorbed by springs.

When it is so desired and the disposition of the motor will so permit, I have provided that the shaft 2 may be driven from the motor through the intermediary of a sprocket-chain, engaging with sprocket-teeth carried about the periphery of either drum 8 or 9. (Shown in the present instance at 44, about drum 8, Figs. 2 and 3.) When the power is to be thus transmitted through a sprocket-chain the shaft 90 may be omitted and the pinion 10 caused to operate as an idler-wheel between the gears 8 and 9. The drums or gear-wheels 8 and 9 are loose on the axle and can be locked thereto, one at a time, by the clutch sections or sleeves 22 and 26.

The drums and gear-wheels above referred to each constitute a section of a clutch, and while I do not confine myself to the use of any particular style of clutch I have illustrated in Fig. 7 one form of clutch which can be conveniently used on my improved vehicle. Each drum or gear-wheel is open at one end for the reception of the expansion-ring 120. This expansion-ring is rigidly secured to the axle 2, and adapted when expanded to engage the inner face of the rim of the drum or wheel and thus lock the drum or wheel to the shaft, and when released from their enforced expansion liberate the drum or wheel from frictional engagement therewith, permitting the drum to run loose on the axle. The expansion-ring 120 is split, and between the split ends are the levers 121, fulcrumed on the axis 122, the short arms of the lever resting between the adjacent ends of the split ring, while their lower ends rest within a slot in the hub of split ring. The tendency of the ring 120 is to close or contract and thus bring the short arms of the levers 121 together, while the long arms thereof are separated. The sliding sections 16, 22, 26 and 28 of the clutches consist each of a sleeve and one or more forks, (shown in Fig. 17 with two forks,) the sleeves 22 and 26 each having one fork while the sleeves 16 and 28 have two. The sleeves are keyed or splined to the axle, and by moving the fork toward the levers 121, the fork straddles the levers and forcing their long arms together separates their short arms, thus expanding the ring and locking it by frictional contact to its respective drum or gear-wheel. These sleeves are keyed or splined to the axle so as to rotate therewith, but are moved longitudinally thereon by the forks 21 and 25. (Clearly shown in Fig. 3.) These forks are mounted in suitable bearings on the section 4 of frame C, and are connected at their lower ends by pitman 24. The forks are so arranged relatively to each other and to the pitman 24 that when one fork has its clutch-section in contact with its respective drum, the other clutch-section is withdrawn, thus leaving its drum free on the axle. Hence it will be seen that by shifting one fork the other is moved also. Secured to fork 21, in line with its journal, is the shaft 23, which latter extends forwardly and is provided at its front end with a laterally-projecting fork 44ˣ, (see Fig. 4,) the outer ends of which engage pintles 44 of collar 43 journaled on the lower end of rod 40. This rod 40 is mounted in the standard 41, which latter is journaled at its lower end in the reach-bar or frame C at a point near the juncture of the converging sides of frame C with the reach-bar of the vehicle. This rod 40 is provided near its upper end with a series of teeth 42, which latter extend around the bar so as to permit the standard 41, carrying the mutilated pinion 47, to revolve. A lug 43 on pinion 47 holds pinion in normal position.

Embracing the standard 41 is a strap 50, the ends of which project at the sides of the standard and form a bearing for the shaft 62 carrying the mutilated pinion 47, the standard 41 being slotted at its side for the reception of the pinion 47, which as before stated, engages the rod 40 and operates to raise and lower the same. Secured to the outer end of shaft 62 is the handle-bar or lever 48, by which the shaft is turned, and mounted in suitable bearings 61 carried by the shaft 62 is the spring-dog 66, which latter is adapted when the parts are in an operative position to enter a hole in the strap 59 and lock the shaft, and hence the rod 40 and shaft 23, against movement.

The handle 48 is shown in a horizontal position, and by withdrawing the spring-catch 66 and turning handle about twenty degrees, more or less, rod 40 will be elevated, shaft 23 given a partial rotation, and the forks 21 and 25 carrying clutch-sections 22 and 26 moved to the left. As shown in Fig. 3, clutch-section 22 is in engagement with the drum or pinion 8. Thus motion is transmitted to shaft 2 through pinions 10 and 8, the pinion 9 being loose on axle 2. The movement of handle 48, before referred to, shifts the clutches sufficiently to unclutch pinion 8, but not sufficiently to clutch up pinion 9, thus disconnecting axle 2 from the drive-shaft 90 of the motor and permitting the vehicle to come to a rest. By now continuing the movement of handle 48 in the same direction clutch-section 26 is locked to its drum or pinion 9 and motion transmitted to axle 2 through pinion 9. It will be seen that the direction of rotation of shaft 2 imparted through pinion 9 is the reverse of that imparted through pinion 8. Hence the movements of the handle 48 referred to, first withdraws the propelling-power from axle 2 and then applies the power in a reverse direction, thus enabling the vehicle to go forward and backward without interfering in the slightest with the motor.

Loosely mounted on the axle 2 are the drums 11 and 12, located respectively on opposite sides of the pinions 8 and 9 and designed to be locked, one at a time, to the shaft or axle 2 by the clutch-sections 16 and 28 respectively. The clutch sections or sleeves are shifted longitudinally by the shafts 29 journaled in bearings carried by frame C. Each shaft 29 is provided at its front end with a crank-arm, the crank on one shaft being pivotally connected to the outer end of the sliding or movable arm 19, while the crank of the other shaft 29 is pivotally connected to the outer end of the sliding or movable arm 30. These arms 19 and 30 are arranged in a line, and are T-shaped, the head or inner end of each arm having an elongated open slot flaring outwardly at its front end. Resting within the slots of the heads of the T-shaped arms are the lugs 33 of the wheel 32. The wheel 32 is mounted on the reach-bar 34, and the lugs are arranged at diametrically-opposite sides, each lug normally resting in its respective slot, and retained against vertical displacement by suitable washers. When the lugs are in their respective slots and in the positions shown in Fig. 2, the clutch-sections or sleeves 16 and 28 are both out of engagement with their drums 11 and 12, thus leaving the drums loose on the axle. When, however, wheel 32 is turned in either direction one of the lugs leaves its slot, while the other lug moves toward the closed end of the slot, and as it moves in the arc of a circle it engages the wall of the slot and moves one of the sliding arms longitudinally inwardly, thus turning its shaft 29 and forcing its clutch-section into engagement with its drum.

As before stated there are integral or rigid connections between the hubs of wheels 1 and the drums 7 and 7ª, respectively, the wheel 1 with its drum 7ª and the wheel 1 with its drum 7 being loose on the axle 2, and are designed to be locked to the axle, each by a clutch. The clutch-sections 16 and 28, which have been referred to in connection with drums 11 and 12 are each of a double character, (shown in Fig. 17,) and as shown in Fig. 3 the clutch-section 16 is located between drums 7 and 11 and is designed, when at one extreme of its movement, to engage the drum 7 and lock it to the shaft 2, and when at its other extreme to engage the drum 11 and lock it to its shaft, the construction and arrangement of the several parts being such that both drums cannot be locked to the axle at the same time. The same is true of the drums 7ª and 12 and clutch-section 28.

Fig. 3 shows the normal positions of these clutch-sections—that is to say, both clutch-sections are normally in engagement with the drums fast to the wheel-hubs, so that the motion of the axle 2 is normally transmitted to the wheels. The construction of wheel 32 and arms 19 and 30 prevent movement of both clutch-sections at the same time. Hence it is impossible to have both ground-wheels disconnected from the axle at the same time.

The steering or guiding of the front or steering wheels is done by ropes 71 and 72 passing around drums 11 and 12 and actuating-gearing which will be referred to later on.

From the foregoing it will be seen that when either clutch-section—say, for instance, section 16, Fig. 2,—is thrown so as to engage 11 and disengage drum 7, the wheel to which drum 7 is secured will be released upon the shaft, while drum 11 will cause the endless chain or cable 71 to move in a direction to turn the front or steering wheels to the left, thus allowing the left ground-wheel to act as a pivot on which the vehicle turns. The clutch-sections are actuated by the wheel 32, and the latter is in turn given a partial rotation by the endless rope or chain 36 which passes around wheel 32 and around the pulley 37, rigidly secured to standard 41. As the wheel 32 is turned one of the lugs leaves the slot in its arm, while the other lug moves toward the rear closed end of the slot, and as the slot is straight and the lug moves in the arc of a circle it follows that the lug moves its arm lengthwise, thus shifting the clutch-section, which releases its ground-wheel and locks its steering-drum to the shaft. Thus it will be seen that the vehicle can be guided by simply turning standard 41, while it can be started, stopped, and its direction of movement reversed by rocking the lever 48 carried by the shaft 62, secured to the standard, every movement of the apparatus being controlled by the operator and by the single lever. Again, by grasping the handle-bar of lever and rocking it, and at the same time moving it laterally, I can shift the steering-wheels simultaneously with the movements of the clutches which control the direction of rotation of the shaft.

Mounted in bearings carried by the standard 41 is the spring-actuated bolt 55. This bolt is adapted to enter one of a series of holes in the plate 38 and hold the standard against movement. The bolt can be readily disengaged by the cord 50 which passes over pulley 54 through shaft 62 and is secured to lever 49 pivoted to the handle 48.

By means of the bolt 55 and the latch 66 the parts can be locked against movement, thus permitting the operator, while on straight roads or on a continuous curve, to lock the parts in position, it only being necessary to grasp and operate the handles to start, stop, or turn the vehicle.

The rope, cable, chain, or equivalent device 72 leading from drum 12 to pulley 70 is crossed while the other device 71 runs straight. The pulleys 70 are secured on the ends of shaft 69, journaled in bearings 68 integral with the upper portion 73 of the fifth-wheel and is provided at a point between said bearings with a worm which meshes with the concave-faced worm-wheel fast to the lower section 66 of the fifth-wheel, the lower section of the fifth-wheel being fast to the front axle 3. Thus it will be seen that by the movements of either cable 71 or 72 the shaft 69 is rotated and the front axle shifted, the worm and worm-wheel acting as a lock which prevents accidental movement of the front axle when either wheel thereon meets with a shock, as in falling into a hollow or striking a projection.

In order to bring the vehicle to a stop after the power has been removed or cut out I apply the brakes shown in Fig. 6 to the drums 7 and 7ª. Each brake consists of two sections 75 of unequal lengths pivoted to the opposite sides of the part 4ª of the frame C. These sections 75 are preferably made of spring metal, and each is provided on its inner face with a bearing block or shoe adapted to engage the outer face of its drum. Pivoted to the lower end of the longer section 75 is the link 80, and connected to the opposite end of link 80 is the long end of lever 79. This lever is pivoted to the bracket secured to the section 4 of frame C, and is connected by its shorter arm to the free end of the short section 75 of the brake. Connected to the lower end of each longer arm is a pitman 81, which latter are connected at their forward ends to a bar projecting laterally from the lower end of brake-lever 83. This brake-lever is pivoted to the frame C or to the reach-bar 34, and projects upwardly through a slot in the bottom of the vehicle and terminates in a foot-piece which is within easy reach of the operator. By pressing forwardly on the upper end of lever 83, pitmen 81 are moved rearwardly, which operates to force the shoe carried by the longer section 75 of the brake rearwardly and acting through link 8 and lever 79 draws the shorter section forwardly, the arrangement being such that both shoes engage the drum at the same time, thus exerting friction on opposite sides of the drums. While I have disclosed a foot-lever for applying the brakes, it is evident that a hand-lever could be used for the same purpose, and by placing the shorter section 75 in front instead of behind the drum as it now is a pull on the lever 83 instead of a push would operate to apply the brakes.

If desired I can dispense altogether with the drums 11 and 12 and guide or steer the vehicle by the ropes 87. (Shown in Fig. 11.) In this device the ropes pass around or are secured to the lower section of the fifth-wheel and also to the pulley 37 on standard 41, and hence when standard 41 is given a partial rotation to release either ground-wheel from the axle the same movement turns the section of the fifth-wheel carrying the axle and steers the vehicle. When this modified form is employed I prefer to interpose springs 92 in each rope 87 for the purpose of absorbing the shocks when the front wheels come in contact with an obstruction; but for further and preferred modification reference is made to the plan of carrying and operating the forward or steering wheels, as clearly revealed in Figs. 14, 15 and 16.

In Fig. 16, 102 represents a lever having a collar 98, the long arm of said lever having a jointed connection with a pitman at 103. The lever is also provided with a shoulder 99 and the short arm of the lever carries one of the front or steering wheels 1. 101 is a screw upon which to secure a nut for keeping wheel 1 in place. In Fig. 15 is shown the manner of effecting the application of this lever. 105 is a brace, which may have a spindle 104 turned up at right angles to pass through the collar 98 of the lever, or this brace may be perforated to permit the passage of a bolt 109 which passes through the collar 98 and is secured in position by a nut upon one of its ends and a head at its other end. In the same figure is shown a spring 110, which rides upon the upper face of the collars 98, the under face of which rides upon the brace 105. The spring 110 may be secured by the bolt 109 or by the spindle 104 and the nut 115, and to this spring a spring-bar 112 may be secured for carrying the body of the vehicle. In Fig. 14 an angle of the brace 105 is shown as secured to the reach-bar 34 for strengthening the said brace, the collars 98 are shown as fulcrumed upon the spindles 104, the short arms of the lever as carrying the forward or steering-wheels 1, the long arms of the lever having a jointed connection with the pitmen 106, which in turn are pivotally secured upon the wheel 37 which forms a part of the controller. The brace 105 being immovably secured to the reach-bar by bolts 108 and 114, while the brace does not move, it is provided that the levers carrying the front wheels shall move under the influence of a controller, and when the handle-bar 48 is drawn to one side, one of the long arms of the lever 98 will be drawn inward, while the other long arm of lever 98 will be pushed outward, thus effecting a movement to the wheels 1 which will cause them to continue parallel with relation to each other, in whichsoever direction they may be turned, whether to the right, left, or in line corresponding with the run of the rear or drive-wheels 1.

In Fig. 10 I have shown a modified form of controller. In the controller shown in Figs. 4 and 5 the shaft 62 is in a plane to one side of the standard, and a pinion is employed for operating rod 40. In the construction disclosed in Fig. 10 the shaft passes centrally through the controller and is provided with depending crank-arms 94. These arms 94 are connected in turn to the links 96, the lower ends of which latter engage pins 95 carried by the rod 40 and passing outwardly through slots 97 in the sides of the standard.

As shown in Fig. 1, the controller passes up through the bottom of the vehicle-body within easy reach of the operator, and by the simple oscillation and lateral movements of the shaft carried by the controller the vehicle can be made to go forward or back and move in a curved line while moving either backward or forward.

It is evident that numerous changes in the construction of the several parts and arrangement of the parts themselves might be made, and hence I would have it understood that I do not confine myself to the exact construction and arrangement as shown but consider myself at liberty to make such changes and alterations as fairly fall within the spirit and scope of my invention.

Having fully described my invention, what I claim as new, and desire to secure by Letters Patent, is—

1. In a vehicle the combination with a driving axle and ground wheels loose thereon, of a clutch for coupling up each ground wheel to the axle, a lever, means connecting the lever and both clutches whereby either clutch can be moved to disconnect its respective ground wheel, and means connecting the driving axle, and steering wheels, whereby when either ground wheel is disconnected from the driving axle, the front or steering wheels are turned.

2. The combination with a driving axle and ground wheels loosely mounted thereon, of means for connecting the axle with and disconnecting it from either ground wheel, means for reversing the direction of rotation of said axle, steering wheel, and means connecting the driving axle and steering wheel, whereby the latter is shifted by the former.

3. The combination with a driving axle, driving wheels thereon, a clutch for coupling up each driving wheel to the axle, steering wheel, and means connecting the steering wheel with the driving axle, whereby when either ground wheel is disconnected from the driving axle, the front or steering wheel is shifted.

4. The combination with a driving axle and wheels loose thereon, clutches for locking the wheels to the axle, reversing gearing loose on said axle, and clutches for locking the gearing to the axle, of a controller, and devices connecting the several clutches and the controller, whereby the two clutches for locking the gearing to the axle are actuated simultaneously, one to release the gear the other to move toward its gear, and the two clutches for locking the ground wheels to the axle being actuated one at a time, substantially as set forth.

5. The combination with an axle, and two ground wheels and two drums loose thereon, steering gear and devices connecting the steering gear and drums, of two clutch sections or sleeves each adapted to engage a clutch section carried by the drum and wheels and couple one drum and one ground wheel to the axle, each clutch section being so disposed in relation to its wheel and drum that when the wheel is locked to the axle the drum is loose and when the drum is locked the wheel is loose, and means for shifting the clutch sections.

6. The combination with an axle, ground or driving wheels thereon, a clutch for locking each ground or driving wheel to the axle, and steering wheels, of a controller, clutch shifting devices actuated positively by said controller, and devices actuated by the driving axle for shifting the steering wheels.

7. The combination with an axle, ground or driving wheels loose thereon, and a clutch for locking each ground or driving wheel to the axle, or clutch shifting device for each clutch, sliding or movable arms connected to clutch shifting devices, each sliding arm having an open slot therein, a wheel having lugs adapted to normally rest in the slots of both arms, and means for turning the wheel, whereby one lug thereon leaves the slot in its arm and the other lug engages the wall of its slot and moves its arms in a direction to unclutch its ground wheel.

8. The combination with an axle, ground or driving wheels thereon and a clutch for locking each ground or driving wheel to the axle, of a clutch shifting device for each clutch, a slotted arm connected to shifting device, a wheel having lugs resting normally in the slots, a lever, and devices connecting the wheel and lever, substantially as set forth.

9. The combination with a driving axle having loose wheels thereon, each wheel carrying a clutch section, a front or steering axle and drums loose on the driving axle, each drum also carrying a clutch-section, of sliding sections or sleeves for normally locking the ground wheels to the axle, but adapted when shifted, to release the ground wheels and lock the drums, and devices connecting the drums and front or steering axle for turning the latter.

10. The combination with a driving axle having loose wheels thereon, front or steering-wheels, and drums loose on the driving axle, of clutch sections for normally locking the ground wheels to the axle, but adapted when shifted to release the ground wheels and lock the drums, devices connecting the drums and front or steering wheels, and a controller and devices connecting the controller and clutches, substantially as set forth.

11. The combination with a driving-axle having reversing-gear loose thereon, clutch-sections or sleeves coupled so as to move in unison for coupling one and uncoupling the other gear, a pinion meshing with both gear-wheels, driving or ground wheels loose on the axle and clutches for coupling the wheels to the axle, of a controller or operating standard, and devices connecting the several clutches and controller, substantially as set forth.

12. The combination with an axle, ground-wheels thereon, drums loose on the axle, clutches for locking the drums to said axle, front or steering wheels, worm shaft and gear for shifting the front or steering wheels, and ropes or cables connecting the drums on the axle with the worm shaft, of devices for actuating the clutches one at a time whereby either drum may be locked to the axle while the other remains loose thereon.

13. The combination with an axle, ground wheels thereon, a frame mounted on the axle and carrying springs adapted to support a motor, a flexible shaft and reversing gearing actuated by the flexible shaft, of a vehicle body mounted on springs carried by the frame on the axle.

14. The combination with a driving shaft, ground wheels and drums loosely mounted thereon, the said drums being arranged adjacent to the wheels, a clutch for each ground wheel to operate with its adjacent drum, front or steering wheels, worm shaft and gear for shifting the front or steering wheels, and flexible devices connecting the drums and worm shaft, of a rotary or oscillatory standard, and means for connecting the said standard and clutches, whereby either clutch sleeve or section may be shifted so as to release its ground wheel and lock its drum to the axle, substantially as set forth.

15. The combination with a driving axle, ground or driving wheels loose thereon, and drums rigid with the wheel hubs and loose on the axle and clutches for locking the drums to the axle, of brake shoes, and means for forcing the shoes into contact with the peripheries of the drums.

16. The combination with a driving axle, ground or driving wheels loose thereon, drums rigid with the wheel hubs and loose on the axle, and clutches for locking the drums to the axle, of means for rotating the axle, means for shifting the clutch sleeves or sections, a pair of brake shoes for each drum, means for applying the shoes of each pair simultaneously.

17. The combination with a driving axle, ground or driving wheels loose thereon, drums rigid with the wheel hubs and loose on the axle and clutches for locking the drums to said axle, of a brake mechanism for each drum, each brake mechanism consisting of a long and short arm each carrying a brake shoe, a lever pivoted to each short arm, a link connecting the lever and long arm devices leading to a position convenient to the operator for applying the brakes, substantially as set forth.

18. The combination with a driving axle, reversing gearing loose thereon, driving or ground wheels also loose on the axle, and clutches for locking the reversing gear and ground wheels to the axle, of a controller consisting essentially of a vertical standard, means connecting the same with the wheel clutches whereby the latter are operated, a vertical sliding rod constituting part of the controller, and means connecting the sliding rod with the clutches which operate to lock the driving pinions to the axle.

19. The combination with a driving axle, ground wheels and drums loose thereon, each drum and ground wheel having a clutch section, sliding clutch sections, each of which is adapted to cooperate with the clutch sections of a drum and wheel, whereby when the wheel is locked to the axle the drum is released, and when the drum is locked the wheel is released, and steering wheels, of a controller, and means connecting the drums with the axle of steering wheels, whereby when the controller is operated to shift the steering wheels, the ground wheel on the proper side of the vehicle is disconnected from the axle, and the drum on the same side locked to the axle, substantially as set forth.

20. The combination with a vertical standard adapted to turn, a vertically moving rod in said standard, and a shaft carried by the standard and engaging the rod, whereby when the shaft is rocked the rod is moved vertically, and when the shaft is moved laterally the standard is rocked or oscillated, of an axle having ground wheels loose thereon, reversing gear on said axle, clutches for locking the ground wheels and reversing gear to the axle and means connecting the wheel clutches and standard and the gear clutches and vertically movable rod, substantially as set forth.

21. In a motor vehicle, the combination with a driving axle mounted on wheels, reversing gearing on the axle, and a frame mounted on the axle and carrying springs for supporting a motor, of a flexible or yielding shaft for transmitting motion from the motor to the reversing gearing.

22. In a vehicle the combination with a driving axle, ground wheels and reversing gearing loose thereon, clutches for locking the wheels and gearing to the axle and front or steering wheels, of a controller consisting of a rotary or oscillatory vertical standard, a vertically movable rod within said standard, and a horizontal shaft journaled in the standard and connected to the rod, devices connecting the standard with the steering wheels, and with the wheel clutches on the driving axle, devices connecting the vertically movable rod with the reversing gear clutches and latches for locking the shaft and standard against rotation or oscillation, substantially as set forth.

23. The combination with an axle, ground or driving wheels loose thereon, a clutch for locking each ground wheel to the axle, and front or steering wheels, of clutch shifting devices for each clutch, an operating lever or controller, and devices actuated by said controller for engaging either of said clutch shifting devices and devices actuated by said controller for shifting the steering wheels.

24. The combination with a driving axle having reversing gear loose thereon, clutch sections or sleeves coupled so as to move in unison for coupling one and uncoupling the other gear, a pinion meshing with both gear wheels, driving or ground wheels loose on the axle, clutches for coupling the wheels to the axle, and steering wheels, of a controller or operating standard, and devices connecting the several clutches and controller and steering wheels and controller, substantially as set forth.

25. The combination with an axle and ground wheels and drums loose thereon, said drums having hubs rigid or integral with the ground wheels, as with the drums, of a mechanism or vehicle supporting frame carried upon and journaled about said hubs.

In testimony whereof I have signed this specification in the presence of two subscribing witnesses.

WILLIAM WALLACE GRANT.

Witnesses:
WILLIAM J. LYNCH,
HENRY J. MYERHOLZ, Jr.

It is hereby certified that in Letters Patent No. 552,757, granted January 7, 1896, upon the application of William Wallace Grant, of Brooklyn, New York, for an improvement in "Road-Vehicles," errors appear in the printed specification requiring correction as follows: In line 34, page 2, a comma should be inserted between the numerals "5 6"; line 63, same page, "Fig. 7" should read *Fig. 17;* line 109, page 5, the word "or" should read *of*, and in line 117, same page, the word "arms" should read *arm;* and that the said Letters Patent should be read with these corrections therein that the same may conform to the record of the case in the Patent Office.

Signed, countersigned, and sealed this 4th day of February, A. D., 1896.

[SEAL.] JNO. M. REYNOLDS,
*Assistant Secretary of the Interior.*

Countersigned:
S. T. FISHER,
*Acting Commissioner of Patents.*